(12) United States Patent
Willnauer

(10) Patent No.: US 11,799,644 B2
(45) Date of Patent: *Oct. 24, 2023

(54) DEFAULT PASSWORD REMOVAL

(71) Applicant: Elasticsearch B.V., Mountain View, CA (US)

(72) Inventor: Simon Daniel Willnauer, Berlin (DE)

(73) Assignee: ELASTICSEARCH B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,326

(22) Filed: Oct. 18, 2021

(65) Prior Publication Data

US 2022/0038276 A1 Feb. 3, 2022

Related U.S. Application Data

(63) Continuation of application No. 16/047,959, filed on Jul. 27, 2018, now Pat. No. 11,196,554.

(51) Int. Cl.
*H04L 9/08* (2006.01)
*H04L 9/32* (2006.01)
*H04L 9/06* (2006.01)
*G06F 21/45* (2013.01)

(52) U.S. Cl.
CPC ............ *H04L 9/0869* (2013.01); *G06F 21/45* (2013.01); *H04L 9/0662* (2013.01); *H04L 9/0863* (2013.01); *H04L 9/3226* (2013.01)

(58) Field of Classification Search
CPC ... H04L 9/0863; H04L 9/3226; H04L 9/0869; H04L 9/0662; G06F 21/45
See application file for complete search history.

(56) References Cited

U.S. PATENT DOCUMENTS

| 7,130,839 | B2 | 10/2006 | Boreham et al. | |
| 7,324,953 | B1* | 1/2008 | Murphy | G06Q 30/02 705/7.33 |
| 7,333,943 | B1* | 2/2008 | Charuk | G06Q 10/10 705/26.1 |
| 7,644,432 | B2* | 1/2010 | Patrick | H04L 63/20 717/172 |
| 7,650,505 | B1* | 1/2010 | Masurkar | H04L 67/02 713/176 |

(Continued)

OTHER PUBLICATIONS

G. Kreitz, O. Bodriagov, B. Greschbach, G. Rodnguez-Cano and S. Buchegger, "Passwords in peer-to-peer," 2012 IEEE 12th International Conference on Peer-to-Peer Computing (P2P), Tarragona, Spain, 2012, pp. 167-178. (Year: 2012).*

(Continued)

*Primary Examiner* — Kari L Schmidt
(74) *Attorney, Agent, or Firm* — Quinn IP Law

(57) ABSTRACT

Methods and systems for starting a node without a default password are provided. Exemplary methods include: creating a node responsive to indicia received from a user; checking for an existing keystore in the node; when no existing keystore is in the node: generating a seed password for a predefined user of the node; non-persistently providing the seed password to the user; creating an encrypted keystore in the node; and storing the seed password in the encrypted keystore; and allowing access to the node using the built-in user and seed password.

20 Claims, 7 Drawing Sheets

(56) References Cited

U.S. PATENT DOCUMENTS

| | | | |
|---|---|---|---|
| 7,685,430 B1* | 3/2010 | Masurkar | H04L 63/1466 380/255 |
| 7,730,523 B1* | 6/2010 | Masurkar | H04L 63/168 726/4 |
| 7,801,967 B1 | 9/2010 | Bedell et al. | |
| 7,970,791 B2 | 6/2011 | Liao et al. | |
| 7,975,292 B2* | 7/2011 | Corella | G06F 21/31 713/168 |
| 7,996,392 B2 | 8/2011 | Liao et al. | |
| 8,005,816 B2 | 8/2011 | Krishnaprasad et al. | |
| 8,027,982 B2 | 9/2011 | Ture et al. | |
| 8,166,310 B2* | 4/2012 | Harrison | H04L 63/104 713/184 |
| 8,214,394 B2 | 7/2012 | Krishnaprasad et al. | |
| 8,239,414 B2 | 8/2012 | Liao et al. | |
| 8,332,430 B2 | 12/2012 | Koide et al. | |
| 8,352,475 B2 | 1/2013 | Bhatkar et al. | |
| 8,412,717 B2 | 4/2013 | Liao et al. | |
| 8,433,712 B2 | 4/2013 | Koide et al. | |
| 8,548,997 B1* | 10/2013 | Wu | G06Q 10/103 709/218 |
| 8,595,255 B2 | 11/2013 | Krishnaprasad et al. | |
| 8,601,028 B2 | 12/2013 | Liao et al. | |
| 8,626,794 B2 | 1/2014 | Liao et al. | |
| 8,707,451 B2 | 4/2014 | Ture et al. | |
| 8,725,770 B2 | 5/2014 | Koide et al. | |
| 8,793,489 B2 | 7/2014 | Polunin et al. | |
| 8,838,961 B2* | 9/2014 | Zarfoss, III | H04L 63/083 726/5 |
| 8,875,249 B2 | 10/2014 | Ture et al. | |
| 9,015,858 B2* | 4/2015 | Stamos | H04L 63/083 380/278 |
| 9,069,979 B2 | 6/2015 | Srinivasan et al. | |
| 9,071,606 B2* | 6/2015 | Braun | H04L 63/10 |
| 9,081,816 B2 | 7/2015 | Krishnaprasad et al. | |
| 9,081,950 B2 | 7/2015 | Jain et al. | |
| 9,130,920 B2 | 9/2015 | Pelykh | |
| 9,177,124 B2 | 11/2015 | Krishnaprasad et al. | |
| 9,251,364 B2 | 2/2016 | Ture et al. | |
| 9,288,042 B1* | 3/2016 | Madhukar | H04L 9/0866 |
| 9,355,233 B1* | 5/2016 | Chen | H04L 9/0891 |
| 9,407,433 B1* | 8/2016 | Sohi | H04L 63/06 |
| 9,436,968 B1* | 9/2016 | Kobets | G06Q 50/184 |
| 9,467,437 B2 | 10/2016 | Krishnaprasad et al. | |
| 9,479,494 B2 | 10/2016 | Krishnaprasad et al. | |
| 9,552,431 B2 | 1/2017 | Nassar | |
| 9,594,922 B1* | 3/2017 | McGuire | H04L 9/08 |
| 9,734,309 B1 | 8/2017 | Alien | |
| 9,742,779 B2* | 8/2017 | Ngo | G06F 21/6218 |
| 9,769,154 B2* | 9/2017 | Yang | H04L 63/083 |
| 9,774,586 B1 | 9/2017 | Roche et al. | |
| 9,781,102 B1* | 10/2017 | Knjazihhin | H04L 63/083 |
| 9,824,208 B2* | 11/2017 | Cavanagh | H04L 63/06 |
| 9,858,195 B2* | 1/2018 | Bhogal | G06F 9/45504 |
| 9,930,033 B2* | 3/2018 | Chhabra | H04L 63/0838 |
| 9,992,186 B1 | 6/2018 | Drozd et al. | |
| 10,044,723 B1 | 8/2018 | Fischer et al. | |
| 10,057,246 B1 | 8/2018 | Drozd et al. | |
| 10,083,247 B2 | 9/2018 | Brown et al. | |
| 10,114,964 B2 | 10/2018 | Ramesh et al. | |
| 10,277,618 B1 | 4/2019 | Wu | |
| 10,382,421 B2 | 8/2019 | Krishnaprasad et al. | |
| 10,505,982 B2* | 12/2019 | Motukuru | H04L 63/08 |
| 10,659,307 B2 | 5/2020 | Sinn | |
| 11,023,598 B2 | 6/2021 | Grand | |
| 11,025,425 B2 | 6/2021 | Modi | |
| 11,196,554 B2 | 12/2021 | Willnauer | |
| 11,223,626 B2 | 1/2022 | Gormley | |
| 2003/0037234 A1 | 2/2003 | Fu et al. | |
| 2003/0105742 A1 | 6/2003 | Boreham et al. | |
| 2003/0130928 A1* | 7/2003 | Chozick | G06Q 30/02 705/37 |
| 2004/0019820 A1* | 1/2004 | Whitlow | H04L 67/1095 714/4.11 |
| 2004/0210767 A1* | 10/2004 | Sinclair | H04L 9/40 726/6 |
| 2005/0055232 A1* | 3/2005 | Yates | G06Q 10/10 705/1.1 |
| 2005/0289354 A1 | 12/2005 | Borthakur et al. | |
| 2006/0059359 A1* | 3/2006 | Reasor | G06F 21/6218 713/182 |
| 2007/0208714 A1 | 9/2007 | Ture et al. | |
| 2007/0233688 A1* | 10/2007 | Smolen | G06Q 10/10 707/999.009 |
| 2008/0205655 A1* | 8/2008 | Wilkins | G06Q 10/10 707/999.005 |
| 2008/0313712 A1 | 12/2008 | Ellison et al. | |
| 2009/0046862 A1* | 2/2009 | Ito | H04L 9/088 380/277 |
| 2009/0106271 A1 | 4/2009 | Chieu et al. | |
| 2009/0204590 A1 | 8/2009 | Yaskin et al. | |
| 2009/0254642 A1* | 10/2009 | Geist | H04L 63/10 709/222 |
| 2009/0271624 A1* | 10/2009 | Cao | H04L 9/0844 713/169 |
| 2010/0022306 A1* | 1/2010 | Campion | G06Q 10/06 463/42 |
| 2010/0146611 A1* | 6/2010 | Kuzin | H04L 63/0815 726/8 |
| 2010/0198804 A1 | 8/2010 | Yaskin et al. | |
| 2011/0265160 A1* | 10/2011 | Nettleton | G06F 21/31 726/6 |
| 2012/0060207 A1 | 3/2012 | Mardikar et al. | |
| 2012/0090037 A1 | 4/2012 | Levit | |
| 2012/0131683 A1 | 5/2012 | Nassar | |
| 2012/0151563 A1* | 6/2012 | Bolik | G06F 21/41 726/6 |
| 2013/0080520 A1* | 3/2013 | Kiukkonen | H04W 12/084 709/204 |
| 2013/0152191 A1* | 6/2013 | Bright | H04L 63/0227 726/14 |
| 2013/0212703 A1 | 8/2013 | Ramesh et al. | |
| 2013/0232539 A1 | 9/2013 | Polunin et al. | |
| 2013/0326588 A1 | 12/2013 | Jain et al. | |
| 2014/0075501 A1 | 3/2014 | Srinivasan et al. | |
| 2014/0164776 A1* | 6/2014 | Hook | G06F 21/6218 713/171 |
| 2014/0196115 A1 | 7/2014 | Pelykh | |
| 2014/0208100 A1* | 7/2014 | Kendall | G06F 21/6281 713/187 |
| 2014/0337941 A1* | 11/2014 | Kominar | G06F 21/45 726/6 |
| 2015/0012919 A1* | 1/2015 | Moss | G06F 9/455 718/1 |
| 2015/0089575 A1 | 3/2015 | Vepa et al. | |
| 2015/0106736 A1 | 4/2015 | Torman | |
| 2015/0106893 A1* | 4/2015 | Hou | H04L 9/0891 726/6 |
| 2015/0112870 A1 | 4/2015 | Nagasundaram et al. | |
| 2015/0169875 A1* | 6/2015 | Ide | G06F 21/575 713/2 |
| 2015/0349954 A1* | 12/2015 | Borda | H04L 9/0869 380/44 |
| 2015/0363607 A1* | 12/2015 | Yang | H04L 9/085 713/165 |
| 2016/0103890 A1 | 4/2016 | Boe | |
| 2016/0173475 A1 | 6/2016 | Srinivasan et al. | |
| 2016/0182471 A1 | 6/2016 | Wilson et al. | |
| 2017/0011214 A1* | 1/2017 | Cavanagh | H04L 63/0846 |
| 2017/0063931 A1 | 3/2017 | Seed | |
| 2017/0083698 A1* | 3/2017 | Scott | H04L 9/0863 |
| 2017/0103470 A1* | 4/2017 | Raju | G06Q 20/382 |
| 2017/0134434 A1 | 5/2017 | Allen | |
| 2017/0322985 A1 | 11/2017 | Boe | |
| 2017/0353444 A1 | 12/2017 | Karangutkar et al. | |
| 2018/0109421 A1 | 4/2018 | Laribi | |
| 2018/0210901 A1 | 7/2018 | DePaoli et al. | |
| 2018/0287800 A1 | 10/2018 | Chapman et al. | |
| 2018/0300117 A1* | 10/2018 | Ackerman | G06F 11/0766 |
| 2018/0367528 A1* | 12/2018 | Schwarz | H04L 9/0894 |
| 2019/0018869 A1 | 1/2019 | Bhagwat et al. | |

(56) References Cited

U.S. PATENT DOCUMENTS

| | | | |
|---|---|---|---|
| 2019/0018870 A1 | 1/2019 | Bhagwat et al. | |
| 2019/0052537 A1 | 2/2019 | Sinn | |
| 2019/0080318 A1* | 3/2019 | Yuan | G06Q 20/36 |
| 2019/0116623 A1 | 4/2019 | Apte | |
| 2019/0245763 A1 | 8/2019 | Wu | |
| 2019/0394040 A1 | 12/2019 | Modi | |
| 2020/0007549 A1 | 1/2020 | Gormley | |
| 2020/0036522 A1 | 1/2020 | Willnauer | |
| 2020/0036527 A1* | 1/2020 | Girdhar | H04L 9/0869 |
| 2020/0184090 A1 | 6/2020 | Grand | |
| 2021/0168149 A1 | 6/2021 | Gormley | |
| 2021/0216652 A1 | 7/2021 | Grand | |
| 2021/0243024 A1 | 8/2021 | Modi | |
| 2021/0248250 A1 | 8/2021 | Grand | |

OTHER PUBLICATIONS

Sabine Houy, Philipp Schmid, and Alexandre Bartel. 2023. Security Aspects of Cryptocurrency Wallets—A Systematic Literature Review. ACM Comput. Surv. Just Accepted (May 2023) (Year: 2023).*

Garnica, Gustavo, and Gustavo Garnica. "Node Manager." Oracle WebLogic Server 12c Administration I Exam 1ZO-133: A Comprehensive Certification Guide (2018): 43-60. (Year: 2018).*

"Search Query Report", IP.com, performed Dec. 18, 2020, 4 pages.

Gejibo, Samson et al., "Secure data storage for mobile data collection systems", Proceedings of the International Conference on Management of Emergent Digital EcoSystems, Oct. 28-31, 2012, pp. 131-144.

Kumbhar et al., "Hybrid Encryption for Securing Shared Preferences of Android Applications," 2018 1st International Conference on Data Intelligence and Security (ICDIS), 2018, pp. 246-249.

"Search Query Report", IP.com, performed Sep. 28, 2021, 5 pages.

Willnauer, Simon Daniel, "Default Password Removal," U.S. Appl. No. 16/047,959, filed Jul. 27, 2018, Specification, Claims, Abstract, and Drawings, 37 pages.

Willnauer, Simon Daniel, "Shard Splitting," U.S. Appl. No. 16/176,956, filed Oct. 31, 2018, Specification, Claims, Abstract, and Drawings, 47 pages.

* cited by examiner

500A

520A

0x3fd76c17 // constant to identify the start of codec header elasticsearch.keystore // name of the 'codec'

3 // codec version

0 // boolean value indicating if password has length. 0 is no length. 1 is has length.

88 + <size of encrypted data>

64 // number of salt bytes

<salt> // the actual salt bytes

12 // number of bytes in initialization vector

<iv> // the actual iv bytes

510A <size of encrypted data> // the number of bytes of encrypted data

<encrypted data> // the actual encrypted data bytes

~0x3fd76c17 // constant to identify the start of codec footer

0 // the checksum algorithm used. Currently always 0 to indicate zlib-crc32

<CRC32 value> // the checksum

<number of entries> // the number of unique entries
<key1> // the key for the first entry
<type1> // the type of the first entry (e.g., string, file)
<entryBytes1> // the actual bytes for the first entry value
...
510B <keyN> // the key for the last entry where N = number of entries
<typeN> // the type for the last entry where N = number of entries
<entryBytesN> // the actual bytes for the last entry value where N = number of entries

FIG. 5B

DEFAULT PASSWORD REMOVAL

CROSS-REFERENCE TO RELATED APPLICATIONS

This application is a continuation of U.S. patent application Ser. No. 16/047,959, filed Jul. 27, 2018, entitled "Default Password Removal," which is hereby incorporated by reference for all purposes.

FIELD OF THE INVENTION

The present technology pertains to computer system security and more specifically to user authentication.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data communications networks can be used for a distributed application structure that divides tasks between the providers of a resource or service, called servers, and service requesters, called clients. A server host runs one or more server programs, which share their resources with clients. A client does not necessarily share any of its resources, but requests a server's content or service function. Clients initiate communication sessions with servers which await incoming requests.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for starting a node without a default password. Specifically, a method for starting a node without a default password may comprise creating a node responsive to indicia received from a user; checking for an existing keystore in the node; when no existing keystore is in the node: generating a seed password for a predefined user of the node; non-persistently providing the seed password to the user; creating an encrypted keystore in the node; and storing the seed password in the encrypted keystore. Some embodiments may further include: allowing access to the node using the built-in user and seed password.

BRIEF DESCRIPTION OF THE DRAWINGS

Embodiments are illustrated by way of example, and not by limitation, in the figures of the accompanying drawings, in which like references indicate similar elements and in which:

FIG. 5A is a keystore, according to some embodiments.

FIG. 5B is data structure, according to various embodiments.

DETAILED DESCRIPTION

Figure 1:
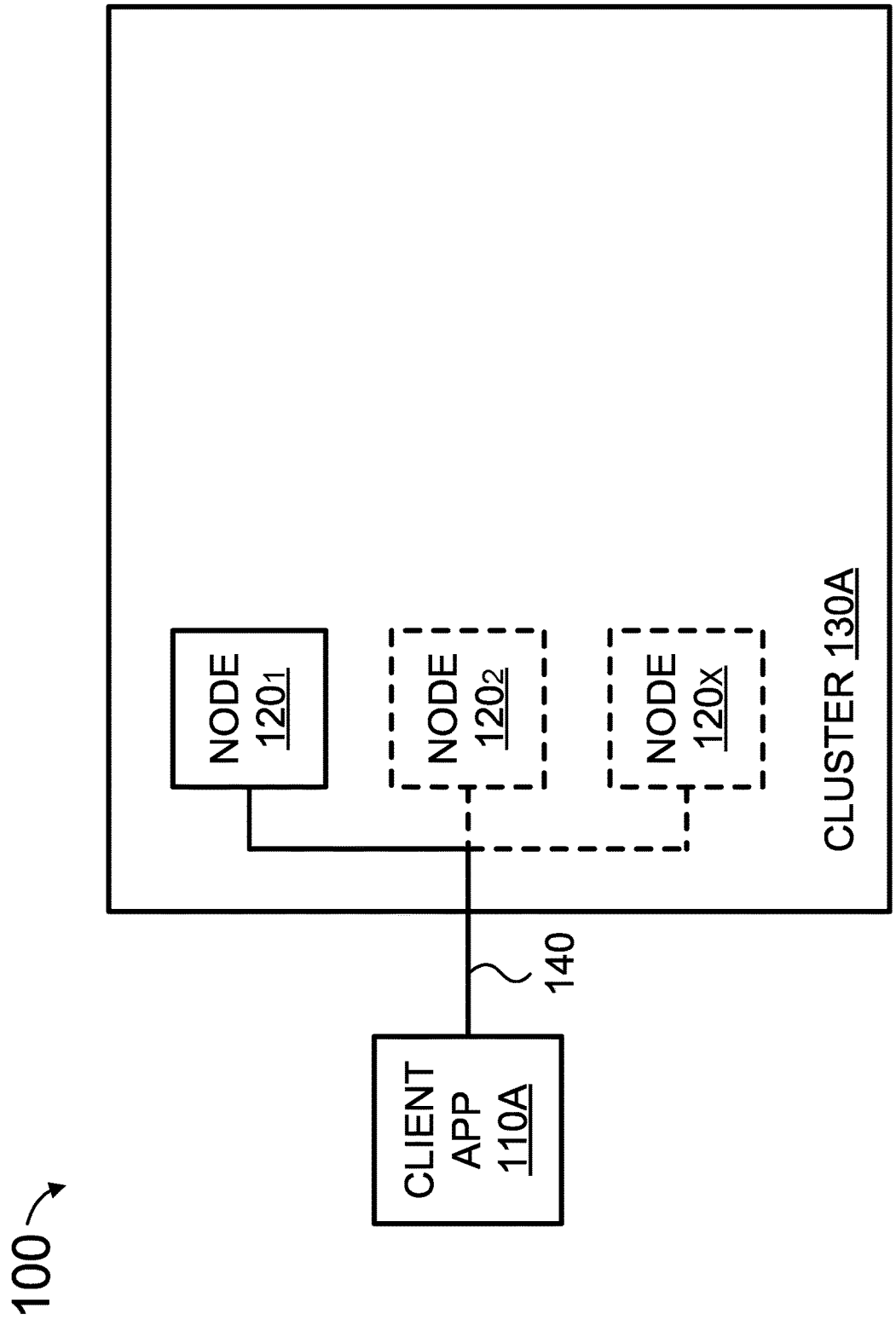
FIG. 1 is a simplified block diagram of a system having a distributed application structure, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 having a distributed application structure, according to some embodiments. System 100 includes client application 110A, one or more nodes 120$_1$-120$_x$, and connections 140. Collectively, one or more nodes 120$_1$-120$_x$ form cluster 130A. When only one node (e.g., node 120$_1$) is running, then cluster 130A is just one node.

In various embodiments, a cluster (e.g., cluster 130A) is a collection of one or more nodes (servers) (e.g., one or more nodes 120$_1$-120$_x$) that together store data and provides federated indexing and search capabilities across all nodes. A cluster can be identified by a unique name, such that a node can be part of a cluster when the node is set up to join the cluster by its name. A cluster may have only one node in it.

In some embodiments, a node (e.g., one or more nodes 120$_1$-120$_x$) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup (described further in relation to FIG. 4). Any number of nodes can be in a single cluster.

An index (not depicted in FIG. 1) is a collection of documents that have somewhat similar characteristics, according to various embodiments. For example, you can have an index for customer data, another index for a product catalog, and yet another index for order data. An index is identified by a name and this name is used to refer to the index when performing indexing, search, update, and delete operations against the documents in it. A document (not depicted in FIG. 1) is a basic unit of information that can be indexed, according to some embodiments. For example, you can have a document for a single customer, another document for a single product, and yet another for a single order. An index can potentially store a large amount of data that can exceed the hardware limits of a single node. For example, a single index of a billion documents taking up 1 TB of disk space may not fit on the disk of a single node or may be too slow to serve search requests from a single node alone. An index can be subdivided into multiple pieces called shards. Each shard can be a fully-functional and independent "index" that can be hosted on any node (e.g., one or more nodes $120_1$-$120_x$) in the cluster.

In some embodiments, one or more application programming interfaces (API) can be used to communicate with a cluster (e.g., cluster 130A). An API can include a set of subroutine definitions and protocols. For example, a node client and/or a transport client can be used be used to communicate with nodes (e.g., one or more nodes $120_1$-$120_x$) in a cluster. A node client joins a local cluster as a non-data node, which doesn't hold any data itself, but knows what data lives on which node in the cluster, and can forward requests directly to the correct node. The transport client can be used to send requests to a remote cluster. It doesn't join the cluster itself, but simply forwards requests to a node in the cluster. Other APIs, such as the RESTful API, can be used. Various languages (e.g., Groovy, JavaScript, .NET, PHP, Perl, Python, Ruby, and the like) can be used to communicate with a cluster using the RESTful API In some embodiments, nodes (e.g., one or more nodes $120_1$-$120_x$) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client application 110A) requests to the appropriate node. Each node can serve one or more purposes, master node and data node.

A master node can perform such cluster-wide actions as creating and/or deleting an index, tracking which nodes (e.g., one or more nodes $120_1$-$120_x$) are part of the cluster (e.g., cluster 130A), and deciding which shards to allocate to which nodes. Data nodes can hold shards that contain documents that have been indexed. Data nodes can handle data related operations such as create, read, update, and delete (operations that are used to administer persistent data storage; also referred to as CRUD), search, and aggregations. Ingest nodes can apply an ingest pipeline (e.g., a definition of a series of processors) to a document in order to transform and enrich the document before indexing. A tribe node can connect to multiple clusters and perform search and other operations across all connected clusters.

Each of client application 110A and one or more nodes $120_1$-$120_x$ can be a physical computing system, virtual machine, container, and the like. Generally, client application 110A can run on the same or different physical computing system, virtual machine, container, and the like as each of one or more nodes $120_1$-$120_x$. Each of one or more nodes $120_1$-$120_x$ can run on the same or different physical computing system, virtual machine, container, and the like as the others of one or more nodes $120_1$-$120_x$. A physical computing system is described further in relation to the exemplary computer system 600 of FIG. 6.

In some embodiments, virtual machines provide a substitute for a physical computing system and the functionality needed to execute entire operating systems. Virtual machines are created and run by a hypervisor which uses native execution to share and manage hardware, allowing for multiple environments which are isolated from one another, yet can exist on the same physical computing system.

In various embodiments, containers are an operating system-level virtualization method for deploying and running distributed applications without launching an entire virtual machine for each application. Containers can look like real computers from the point of view of programs running in them. Generally, a computer program running on an operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

When client application 110A runs on a different physical server from a node (e.g., of one or more nodes $120_1$-$120_x$), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes $120_1$-$120_x$) runs on a different physical computing system from another node (of one or more nodes $120_1$-$120_x$), connections 140 can be a data communications network.

Figure 2:
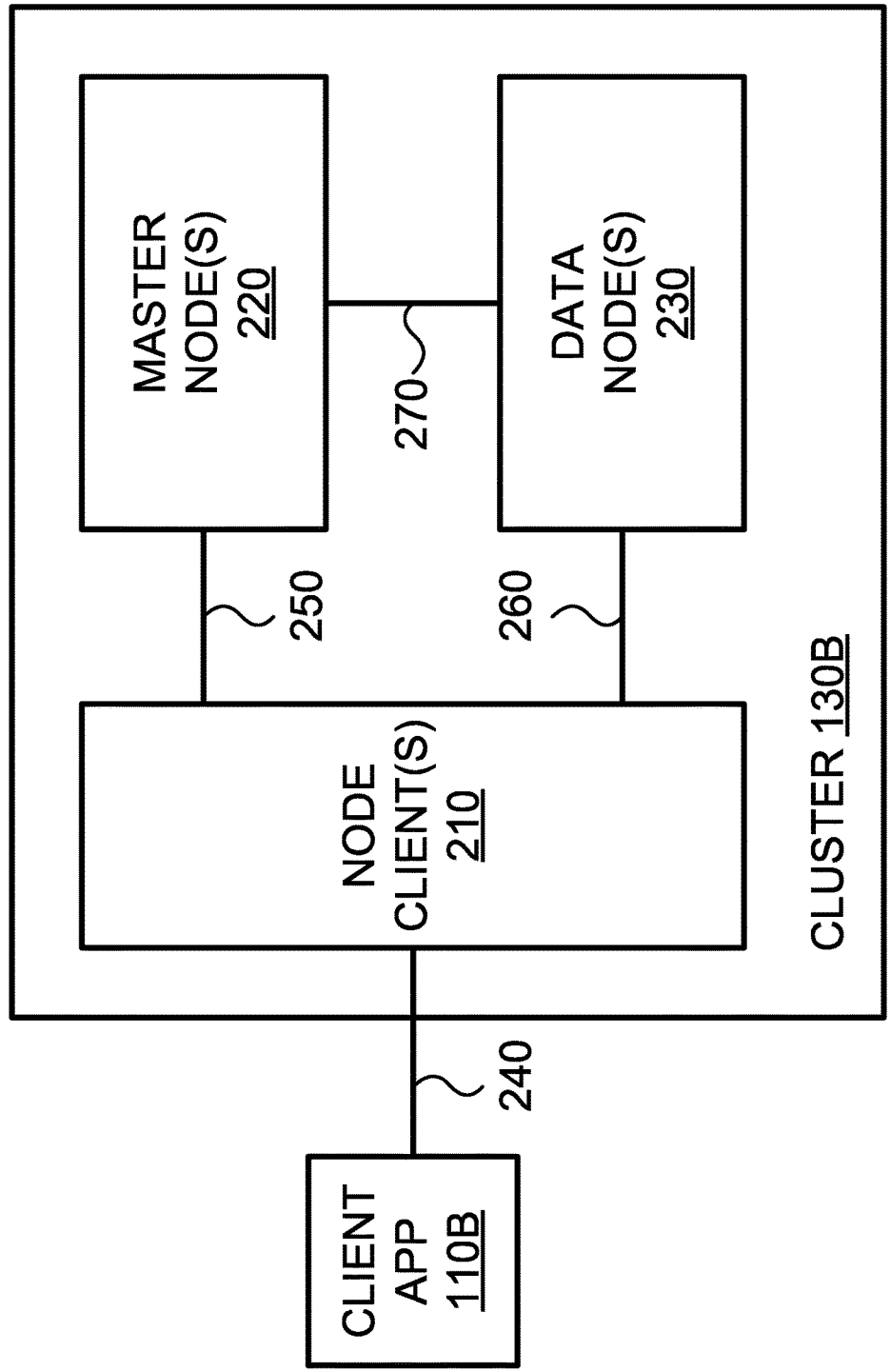
FIG. 2 is a simplified block diagram with a detailed view of a cluster, according to various embodiments.

FIG. 2 shows system 200 having a distributed application structure, according to some embodiments. System 200 can include client application 110B and cluster 130B. Client application 110E and cluster 130B can each have at least some of the characteristics described above in relation to client application 110A and cluster 130A (including one or more nodes $120_1$-$120_x$) in FIG. 1, respectively. Cluster 130B can include node client(s) 210, master node(s) 220, and data node(s) 230. Node clients, master nodes, and data nodes were described above in relation to FIG. 1.

According to various embodiments, connections 240-270 can each include the same or different data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). For example, client application 110B can send an indexing and/or search request to node client(s) 210, and receive an indexing and/or search response from node client(s) 210 via connections 240. By way of further non-limiting example, node client(s) 210 can coordinate cluster state and metadata with master node(s) 220 via connections 250. By way of additional non-limiting example, node client(s) 210 can forward indexing and/or search requests to data node(s) 230, and receive an indexing and/or search response from data node(s) 230 via connections 260. By way of further non-limiting example, master node(s) 220 can coordinate cluster state and metadata with data node(s) 230 via connections 270.

Figure 3:
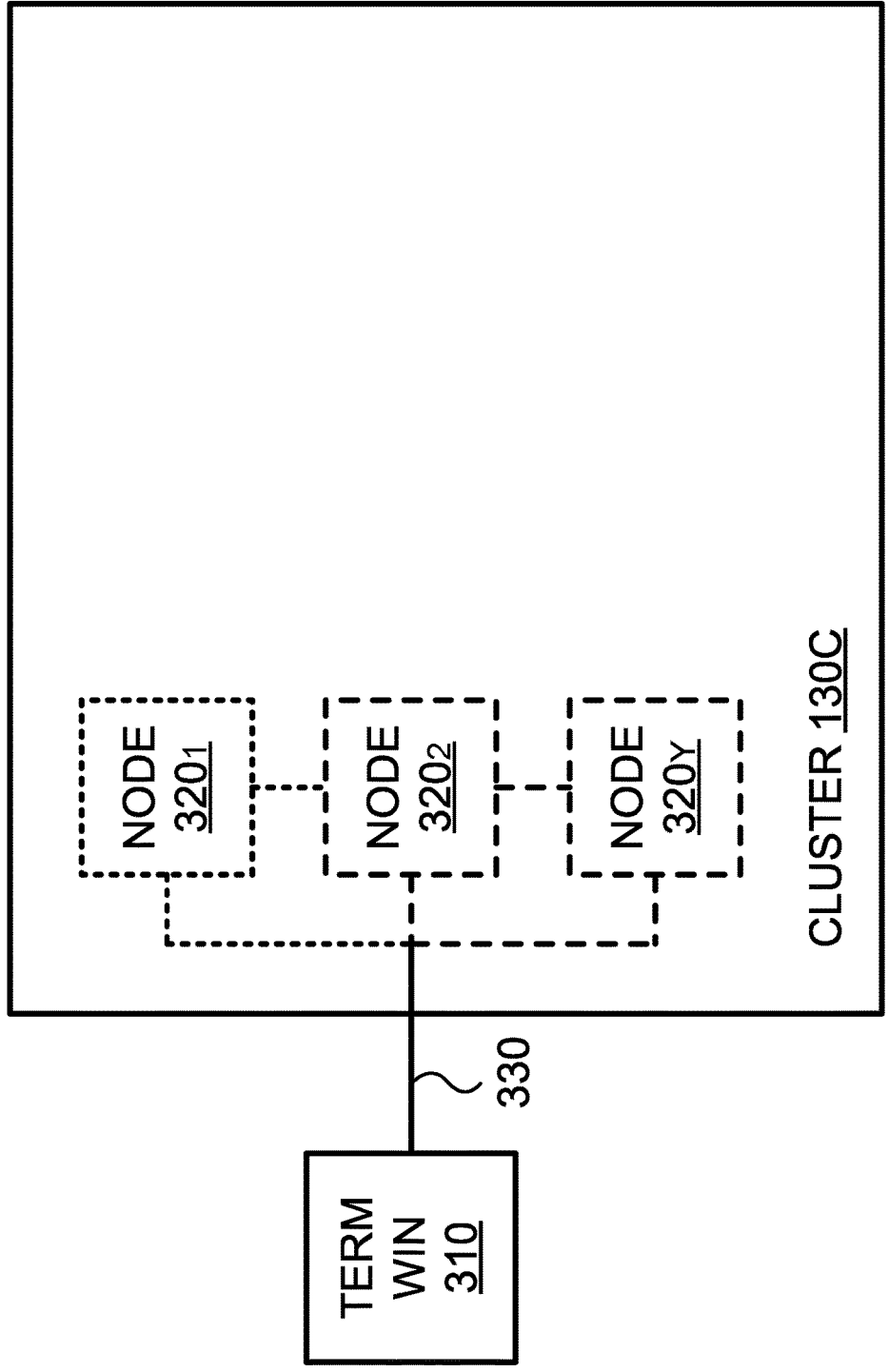
FIG. 3 is a simplified block diagram of a system for creating a node, in accordance with some embodiments.

FIG. 3 illustrates system 300 for creating a node, according to some embodiments. System 300 can include terminal (console) window 310 and cluster 130C. Similar in some ways to client applications 110A and 110B, terminal window 310 is created by a terminal window program and is a window in a graphical interface that is used to display a command line. In other words, terminal window 310 provides a command-line interface (CLI). A CLI is an all-text display mode that has a command interpreter running in it and that shows commands, including their arguments (e.g., input files), and other data as they are typed in at the keyboard, as well as the results of most such commands. A command interpreter, also referred to as a shell, is a program whose primary function is to read commands that are typed into a console or terminal window and then execute (run) them. Terminal window 310 can be used to perform operations in local and remote computers. Connections 330 can include a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). Terminal window 310 and cluster 130C can have at least some of the characteristics described above in relation to client application 110A and cluster 130A (including one or more nodes 1201-120X) in FIG. 1, respectively. Additionally, terminal window 310 and cluster 130C can have at least some of the characteristics described above in relation to client application 110B and cluster 130B (including node client(s) 210, master node(s) 220, and data node(s) 230) in FIG. 2, respectively.

As shown in FIG. 3, cluster 130C having at least one node $320_2$-$320_Y$ may already exist or no nodes exist. When node $320_1$ is created (e.g., a server application is run using terminal window 310), new node $320_1$ can include built-in (pre-determined) default user credentials. For example, an administrator (superuser) account (e.g., used for system administration) with a known default password is in node $320_1$ when it starts up. Other user accounts in addition to the administrator account can also be provided along with same or different default passwords. The administrator account can be accessed using the known default password when node $320_1$ is available on the data communications network of connections 330. The user who created node $320_1$ (or other authorized user) can login to node $320_1$ (e.g., using the built-in account and default password) via the terminal window 310), and change the default administrator password. Such built-in (pre-determined) administrator accounts with (pre-determined) default passwords have the advantage of providing a set of pre-defined user accounts available at startup, which makes setup easier for the (authorized) user. When the default password for an administrator account is not changed, bad actors may use the (known) default password to gain unauthorized high-level access to the node, which is a security hole.

Additionally or alternatively, some (pre-determined) built-in accounts may be provided without (pre-determined) default passwords, according to some embodiments. For example, for some built-in accounts (e.g., administrator account) a seed password is (randomly) generated when node $320_1$ is created and provided to the user who created node $320_1$ (e.g., displayed in terminal window 310). The user who created node $320_1$ can then change the password. In this way, bad actors cannot use a (known) default password—and would have to guess the (random) seed password—to gain unauthorized high-level access to the node. Additionally, since the seed password may not be as easily remembered as a default password, the user who created node $320_1$ (or other authorized user) has an incentive to change the seed password to a password more easily remembered and still more secure than a (known) default password. In various embodiments, the seed password(s) created for node $320_1$ are independent from the passwords already set at the other nodes (e.g., nodes $320_2$-$320_Y$ in their respective keystores) and do not work (are invalid for user authentication) there.

Passwords can be stored in a keystore (not depicted in FIG. 3). The keystore can be encrypted, for example by storing using the keystore PKCS #12 container, which can use Triple DES (3DES) encryption and Secure Hash Algorithm 1 (SHA-1) hashing to protect its contents. Keystores are described further in relation to FIG. 5.

Figure 4:
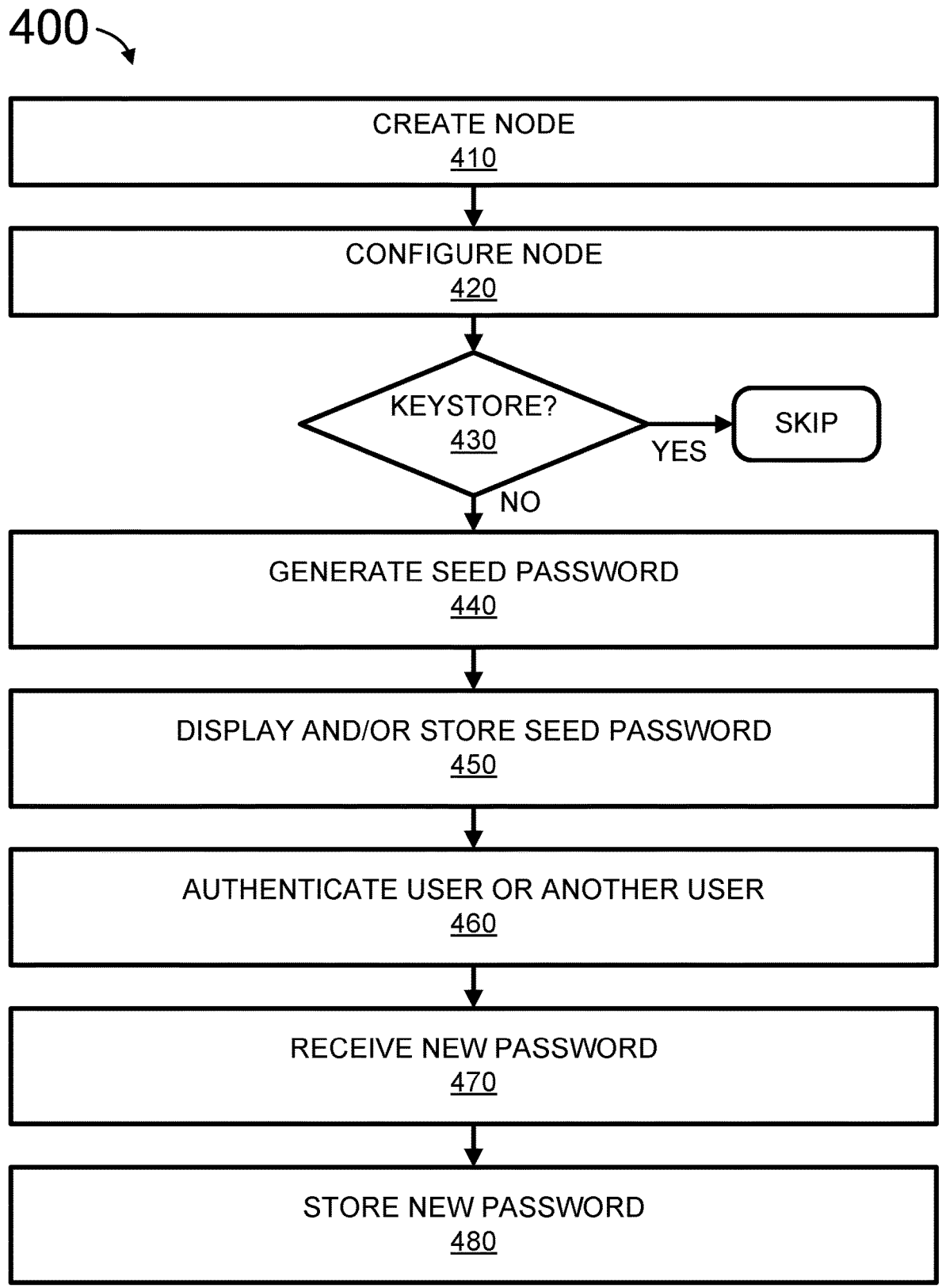
FIG. 4 is a simplified flow diagram of a method for creating a node without a default password, in accordance with various embodiments.

FIG. 4 is a simplified flow diagram of a method 400 for creating a node with a seed password for a built-in (predetermined) user account (e.g., an administrator (superuser)). In various embodiments, method 400 can be performed by system 300 of FIG. 3. At step 410, a node can be created. For example, a user can create node $320_1$ using an instruction entered into terminal window 310 (FIG. 3). By way of further non-limiting example, a user can create node $320_1$ using elements (e.g., pull-down menus, buttons, radio buttons, check boxes, and the like) of a graphic user interface (GUI).

At step 420, the created node can be configured. For example, node $320_1$ can have a (descriptive) name assigned to it; be setup to see other nodes $320_2$-$320_Y$ on the data communications network of connections 330; for high availability be setup to prevent a shard and its replica from being on the same physical machine; and the like. Various aspects of configuring the created node can be performed before or after steps 440-480 of method 400.

At step 430, the node (e.g., node $320_1$) is checked for an existing keystore. When a keystore already exists, method 400 can skip steps 440-480. For example, a user may want to create his or her own (bootstrap) password for the built-in user account and bypass seed password generation by manually creating a keystore. When a keystore does not already exist, method 400 can proceed to step 440.

At step 440, a seed password can be created for the built-in user account. In some embodiments, the seed password is random. A random number generator in the operating system (e.g., reading the UNIX/Linux shell variable RANDOM, and the like), a random number generator program, and the like can be used. In some embodiments, the seed password is generated by a cryptographically secure pseudo-random number generator (e.g., having a higher quality from more entropy), which can satisfy the next-bit test, withstand "state compromise extensions," and the like. For example, random bytes can be read and translated to characters to form a random password (e.g., using character encoding, such as ASCII, Unicode UTF-8, and the like).

At step 450, the seed password can be stored in an encrypted keystore, such as described above in relation to FIG. 3 and below in relation to FIG. 5. Additionally, the seed password can be provided to the user (e.g., in a non-persistent way), such as displayed in terminal window 310 (FIG. 3) and not writing the seed password in plaintext to a file. Plaintext can be ordinary readable text before being encrypted into ciphertext or after being decrypted. At step 460, the user (or other authorized person) can be authenticated by the node using the built-in user account and seed password. At step 470, a new password is received for the built-in user from the user that created node $320_1$ or other authorized user.

At step 480, the new password can be stored in the encrypted keystore.

FIG. 5A depicts keystore (e.g., secure settings store) 500A in plain text, according to some embodiments. Keystore 500A can include multiple fields. As shown in FIG. 5A, each field is represented as an un-indented line which can continue in a following indented line, such as field 510A. Descriptions of each field are included in comments which follow the "ll" characters, such as comment characters 520A.

FIG. 5B depicts data structure (e.g., encrypted data format prior to encryption) 500B, according to some embodiments. Keystore 500B can include multiple fields. As shown in FIG. 5B, each field is represented as an un-indented line which can continue in a following indented line, such as field 510B. Descriptions of each field are included in comments which follow the "ll" characters, such as comment characters 520B.

Figure 6:
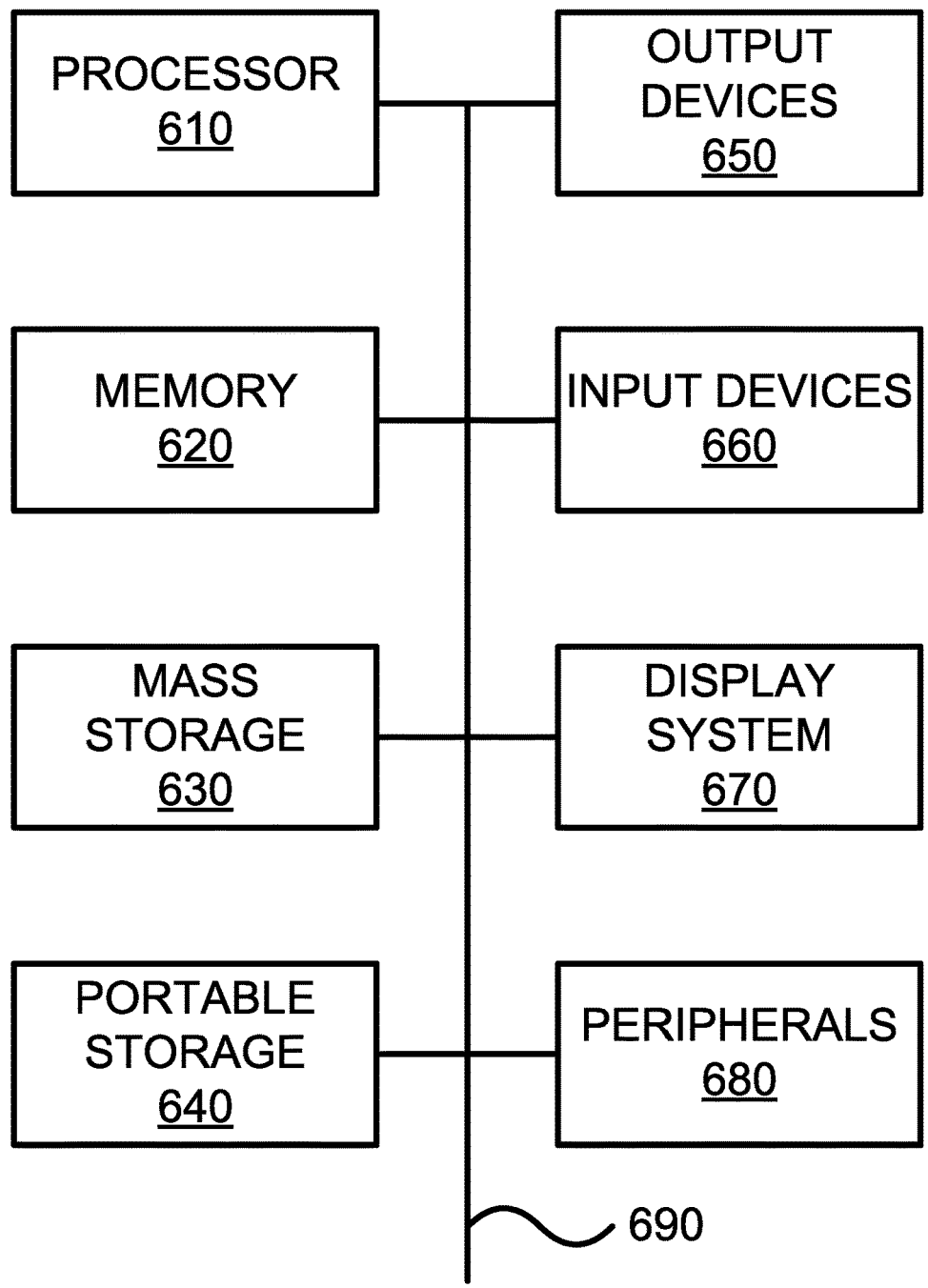
FIG. 6 is a simplified block diagram of a computing system, in accordance with some embodiments.

FIG. 6 illustrates an exemplary computer system 600 that may be used to implement some embodiments of the present invention. The computer system 600 in FIG. 6 may be implemented in the contexts of the likes of computing systems, networks, servers, or combinations thereof. The computer system 600 in FIG. 6 includes one or more processor unit(s) 610 and main memory 620. Main memory 620 stores, in part, instructions and data for execution by processor unit(s) 610. Main memory 620 stores the executable code when in operation, in this example. The computer system 600 in FIG. 6 further includes a mass data storage 630, portable storage device 640, output devices 650, user input devices 660, a graphics display system 670, and peripheral device(s) 680.

The components shown in FIG. 6 are depicted as being connected via a single bus 690. The components may be connected through one or more data transport means. Processor unit(s) 610 and main memory 620 are connected via a local microprocessor bus, and the mass data storage 630, peripheral device(s) 680, portable storage device 640, and graphics display system 670 are connected via one or more input/output (I/O) buses.

Mass data storage 630, which can be implemented with a magnetic disk drive, solid state drive, or an optical disk drive, is a non-volatile storage device for storing data and instructions for use by processor unit(s) 610. Mass data storage 630 stores the system software for implementing embodiments of the present disclosure for purposes of loading that software into main memory 620.

Portable storage device 640 operates in conjunction with a portable non-volatile storage medium, such as a flash drive, floppy disk, compact disk, digital video disc, or Universal Serial Bus (USB) storage device, to input and output data and code to and from the computer system 600 in FIG. 6. The system software for implementing embodiments of the present disclosure is stored on such a portable medium and input to the computer system 600 via the portable storage device 640.

User input devices 660 can provide a portion of a user interface. User input devices 660 may include one or more microphones, an alphanumeric keypad, such as a keyboard, for inputting alphanumeric and other information, or a pointing device, such as a mouse, a trackball, stylus, or cursor direction keys. User input devices 660 can also include a touchscreen. Additionally, the computer system 600 as shown in FIG. 6 includes output devices 650. Suitable output devices 650 include speakers, printers, network interfaces, and monitors.

Graphics display system 670 include a liquid crystal display (LCD) or other suitable display device. Graphics display system 670 is configurable to receive textual and graphical information and processes the information for output to the display device.

Peripheral device(s) 680 may include any type of computer support device to add additional functionality to the computer system.

Some of the components provided in the computer system 600 in FIG. 6 can be those typically found in computer systems that may be suitable for use with embodiments of the present disclosure and are intended to represent a broad category of such computer components. Thus, the computer system 600 in FIG. 6 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 600 may be implemented as a cloud-based computing environment, such as a virtual machine operating within a computing cloud. In other embodiments, the computing system 600 may itself include a cloud-based computing environment, where the functionalities of the computing system 600 are executed in a distributed fashion. Thus, the computing system 600, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for starting a node without a default password comprising:
    creating a node responsive to instructions received from a user via a graphical user interface, without a default password, the node being a physical or virtual computing device that is a part of a cluster;
    configuring the node to participate in indexing and searching capabilities of the cluster;
    checking for an existing keystore in the node;

when no existing keystore is in the node:
   generating a seed password for a built-in user account of the node;
   non-persistently providing the seed password to the user;
   creating an encrypted keystore in the node; and
   storing the seed password in the encrypted keystore; and
allowing access to the node using the built-in user account and the seed password.

2. The computer-implemented method of claim 1 further comprising:
   receiving a new password for the predefined user from the user or another user; and
   storing the new password in the encrypted keystore.

3. The computer-implemented method of claim 2, wherein creating the node includes at least one of: setting a name for the node and configuring the node to see other nodes in a cluster, the node being a part of the cluster.

4. The computer-implemented method of claim 3, wherein the seed password is randomly generated.

5. The computer-implemented method of claim 4, wherein the seed password is randomly generated using a cryptographically secure pseudo-random number generator.

6. The computer-implemented method of claim 1, wherein the encrypted keystore is encrypted using at least one of: Triple DES, RSA, Blowfish, Twofish, and Advanced Encryption Standard (AES).

7. The computer-implemented method of claim 1, wherein the node is at least one of a master node and data node.

8. The computer-implemented method of claim 1, wherein non-persistently providing the seed password to the user comprises displaying the seed password to the user.

9. A system comprising:
   a processor; and
   a memory communicatively coupled to the processor, the memory storing instructions executable by the processor to perform a method for starting a node without a default password, the method comprising:
   creating a node responsive to instructions received from a user via a graphical user interface, without a default password, the node being a physical or virtual computing device that is a part of a cluster;
   configuring the node to participate in indexing and searching capabilities of the cluster;
   checking for an existing keystore in the node;
   when no existing keystore is in the node:
      generating a seed password for a built-in user account of the node;
      non-persistently providing the seed password to the user;
      creating an encrypted keystore in the node; and
      storing the seed password in the encrypted keystore; and
   allowing access to the node using the built-in user account and the seed password.

10. The system of claim 9 further comprising:
    receiving a new password for the predefined user from the user or another user; and
    storing the new password in the encrypted keystore.

11. The system of claim 9, wherein creating the node includes at least one of: setting a name for the node and configuring the node to see other nodes in a cluster, the node being a part of the cluster.

12. The system of claim 9, wherein the seed password is randomly generated.

13. The system of claim 12, wherein the seed password is randomly generated using a cryptographically secure pseudo-random number generator.

14. The system of claim 9, wherein the encrypted keystore is encrypted using at least one of: Triple DES, RSA, Blowfish, Twofish, and Advanced Encryption Standard (AES).

15. The system of claim 9, wherein the node is at least one of a master node and data node.

16. The system of claim 9, wherein non-persistently providing the seed password to the user comprises displaying the seed password to the user.

17. A system comprising:
    means for creating a node responsive to instructions received from a user via a graphical user interface, without a default password, the node being a physical or virtual computing device that is a part of a cluster;
    means for configuring the node to participate in indexing and searching capabilities of the cluster;
    means for checking for an existing keystore in the node;
    when no existing keystore is in the node:
       means for generating a seed password for a built-in user account of the node;
       means for non-persistently providing the seed password to the user;
       means for creating an encrypted keystore in the node; and
       means for storing the seed password in the encrypted keystore; and
    means for allowing access to the node using the built-in user account and the seed password.

18. The system of claim 17, further comprising:
    means for receiving a new password for the predefined user from the user or another user; and
    means for storing the new password in the encrypted keystore.

19. The system of claim 17, wherein means for creating the node includes at least one of: means for setting a name for the node and means for configuring the node to see other nodes in a cluster, the node being a part of the cluster.

20. The system of claim 17, wherein means for non-persistently providing the seed password to the user comprises means for displaying the seed password to the user.

* * * * *